United States Patent
Venkatachar et al.

(10) Patent No.: US 11,579,884 B2
(45) Date of Patent: Feb. 14, 2023

(54) INSTRUCTION ADDRESS TRANSLATION AND CACHING FOR PRIMARY AND ALTERNATE BRANCH PREDICTION PATHS

(71) Applicant: Advanced Micro Devices, Inc., Santa Clara, CA (US)

(72) Inventors: Ashok Tirupathy Venkatachar, Santa Clara, CA (US); Steven R. Havlir, Austin, TX (US); Robert B. Cohen, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/913,520

(22) Filed: Jun. 26, 2020

(65) Prior Publication Data

US 2021/0406024 A1    Dec. 30, 2021

(51) Int. Cl.
*G06F 9/30* (2018.01)
*G06F 9/38* (2018.01)
*G06F 12/1027* (2016.01)

(52) U.S. Cl.
CPC ........ *G06F 9/3806* (2013.01); *G06F 9/30047* (2013.01); *G06F 9/30065* (2013.01); *G06F 9/3844* (2013.01); *G06F 12/1027* (2013.01)

(58) Field of Classification Search
CPC .. G06F 9/3806; G06F 9/30047; G06F 9/3844; G06F 12/1027; G06F 9/30065
See application file for complete search history.

(56) References Cited

U.S. PATENT DOCUMENTS

| | | | |
|---|---|---|---|
| 4,305,124 A * | 12/1981 | Marro | G06F 9/3867 712/42 |
| 5,696,958 A * | 12/1997 | Mowry | G06F 9/3804 712/E9.056 |
| 5,781,753 A | 7/1998 | McFarland et al. | |
| 5,860,017 A * | 1/1999 | Sharangpani | G06F 9/3804 712/E9.05 |
| 6,157,988 A * | 12/2000 | Dowling | G06F 12/0875 711/140 |
| 6,208,543 B1 * | 3/2001 | Tupuri | G11C 15/00 365/189.03 |
| 10,642,618 B1 | 5/2020 | Hakewill et al. | |
| 2002/0062418 A1 | 5/2002 | Luick | |
| 2002/0194464 A1 * | 12/2002 | Henry | G06F 9/30061 712/239 |
| 2003/0074540 A1 * | 4/2003 | Arimilli | G06F 12/1036 711/204 |
| 2004/0148491 A1 * | 7/2004 | Damron | G06F 9/383 712/34 |
| 2007/0106878 A1 | 5/2007 | Nguyen et al. | |

(Continued)

Primary Examiner — Shawn Doman
(74) Attorney, Agent, or Firm — Volpe Koenig

(57) ABSTRACT

Techniques for performing instruction fetch operations are provided. The techniques include determining instruction addresses for a primary branch prediction path; requesting that a level 0 translation lookaside buffer ("TLB") caches address translations for the primary branch prediction path; determining either or both of alternate control flow path instruction addresses and lookahead control flow path instruction addresses; and requesting that either the level 0 TLB or an alternative level TLB caches address translations for either or both of the alternate control flow path instruction addresses and the lookahead control flow path instruction addresses.

20 Claims, 5 Drawing Sheets

(56) References Cited

U.S. PATENT DOCUMENTS

| | | | |
|---|---|---|---|
| 2009/0210663 A1 | 8/2009 | Sartorius et al. | |
| 2011/0138149 A1* | 6/2011 | Karlsson | G06F 12/1027 |
| | | | 711/207 |
| 2012/0226892 A1* | 9/2012 | Tirumalai | G06F 9/383 |
| | | | 712/207 |
| 2013/0046964 A1* | 2/2013 | Dvoretzki | G06F 9/3861 |
| | | | 712/235 |
| 2014/0115226 A1* | 4/2014 | Chandrakar | G06F 12/1027 |
| | | | 711/3 |
| 2015/0026443 A1* | 1/2015 | Kumar | G06F 9/3867 |
| | | | 712/234 |
| 2017/0115988 A1* | 4/2017 | Jung | G06F 8/4441 |
| 2017/0147346 A1* | 5/2017 | Hornung | G06F 9/3806 |
| 2017/0300425 A1* | 10/2017 | Meredith | G06F 12/1045 |
| 2018/0150297 A1* | 5/2018 | Batley | G06F 9/3867 |
| 2019/0258485 A1* | 8/2019 | Bouzgarrou | G06F 9/3806 |
| 2020/0371811 A1* | 11/2020 | Govindan | G06F 9/3842 |

\* cited by examiner

INSTRUCTION ADDRESS TRANSLATION AND CACHING FOR PRIMARY AND ALTERNATE BRANCH PREDICTION PATHS

BACKGROUND

In a microprocessor, instructions are fetched for execution sequentially until a branch occurs. A branch causes a change in the address from which instructions are fetched and may be associated with delays in instruction fetch throughput. For example, branches may need to be evaluated to determine whether to take the branch as well as what the branch destination is. However, branches cannot be evaluated until the branch has entered the instruction execution pipeline. Branch delays are associated with the difference between the time that the branch is fetched and the time that the branch is evaluated to determine the outcome of that branch and thus what instructions need to be fetched next. Branch prediction helps to mitigate this delay by predicting the existence and outcome of a branch instruction based upon instruction address. Improvements to the operation of branch predictors are therefore desirable.

BRIEF DESCRIPTION OF THE DRAWINGS

A more detailed understanding may be had from the following description, given by way of example in conjunction with the accompanying drawings wherein.

DETAILED DESCRIPTION

Techniques for performing instruction fetch operations are provided. The techniques include determining instruction addresses for a primary branch prediction path; requesting that a level 0 translation lookaside buffer ("TLB") caches address translations for the primary branch prediction path; determining either or both of alternate control flow path instruction addresses and lookahead control flow path instruction addresses; and requesting that a level 1 TLB caches address translations for either or both of the alternate control flow path instruction addresses and the lookahead control flow path instruction addresses.

Figure 1:
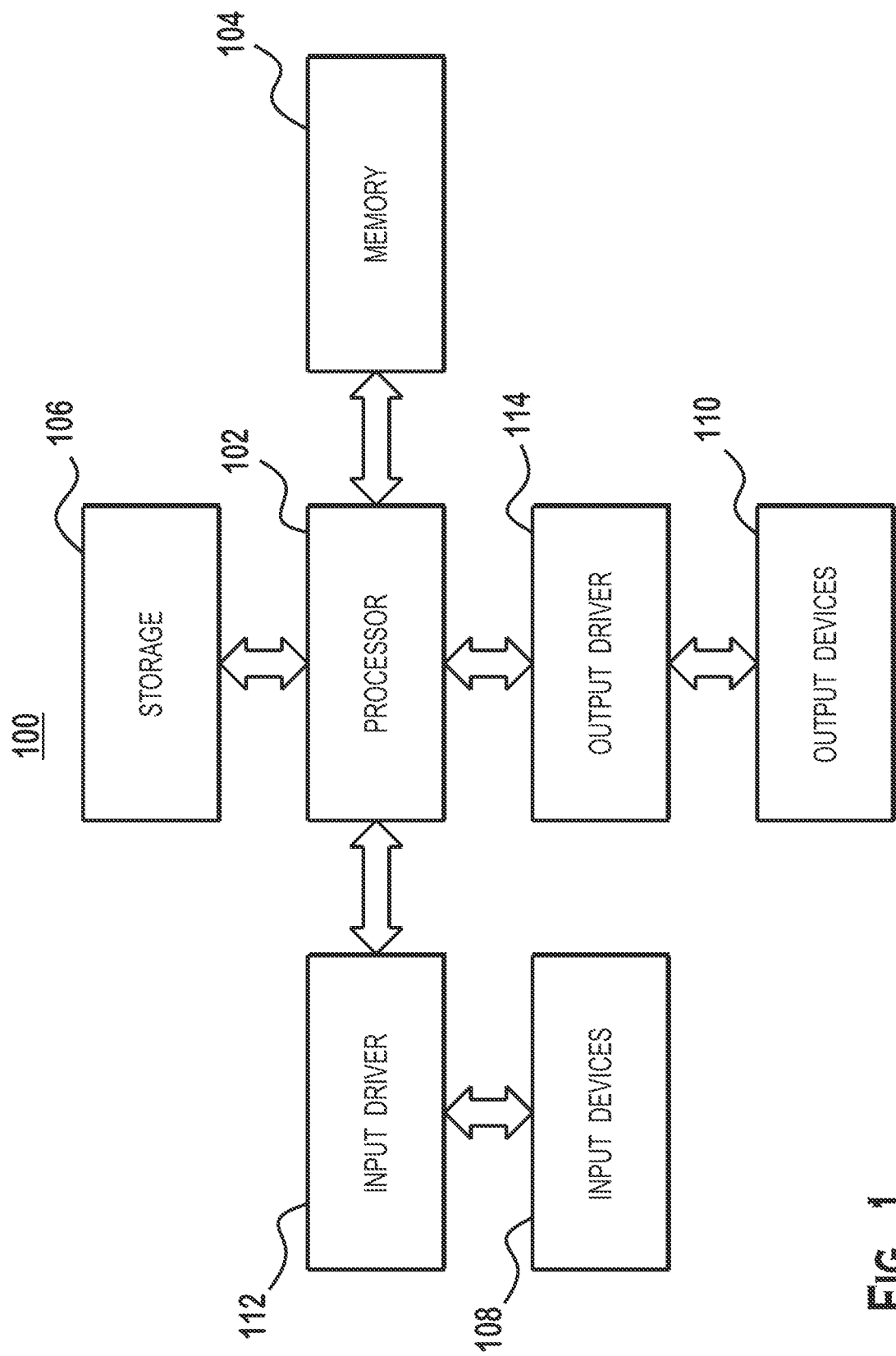
FIG. 1 is a block diagram of an example device in which one or more disclosed embodiments may be implemented.

FIG. 1 is a block diagram of an example device 100 in which aspects of the present disclosure are implemented. The device 100 includes, for example, a computer, a gaming device, a handheld device, a set-top box, a television, a mobile phone, or a tablet computer. The device 100 includes a processor 102, a memory 104, a storage device 106, one or more input devices 108, and one or more output devices 110. The device 100 may also optionally include an input driver 112 and an output driver 114. It is understood that the device 100 may include additional components not shown in FIG. 1.

The processor 102 includes a central processing unit (CPU), a graphics processing unit (GPU), a CPU and GPU located on the same die, or one or more processor cores, wherein each processor core is a CPU or a GPU. The memory 104 may be located on the same die as the processor 102, or may be located separately from the processor 102. The memory 104 includes a volatile or non-volatile memory, for example, random access memory (RAM), dynamic RAM, or a cache.

The storage device 106 includes a fixed or removable storage, for example, a hard disk drive, a solid state drive, an optical disk, or a flash drive. The input devices 108 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
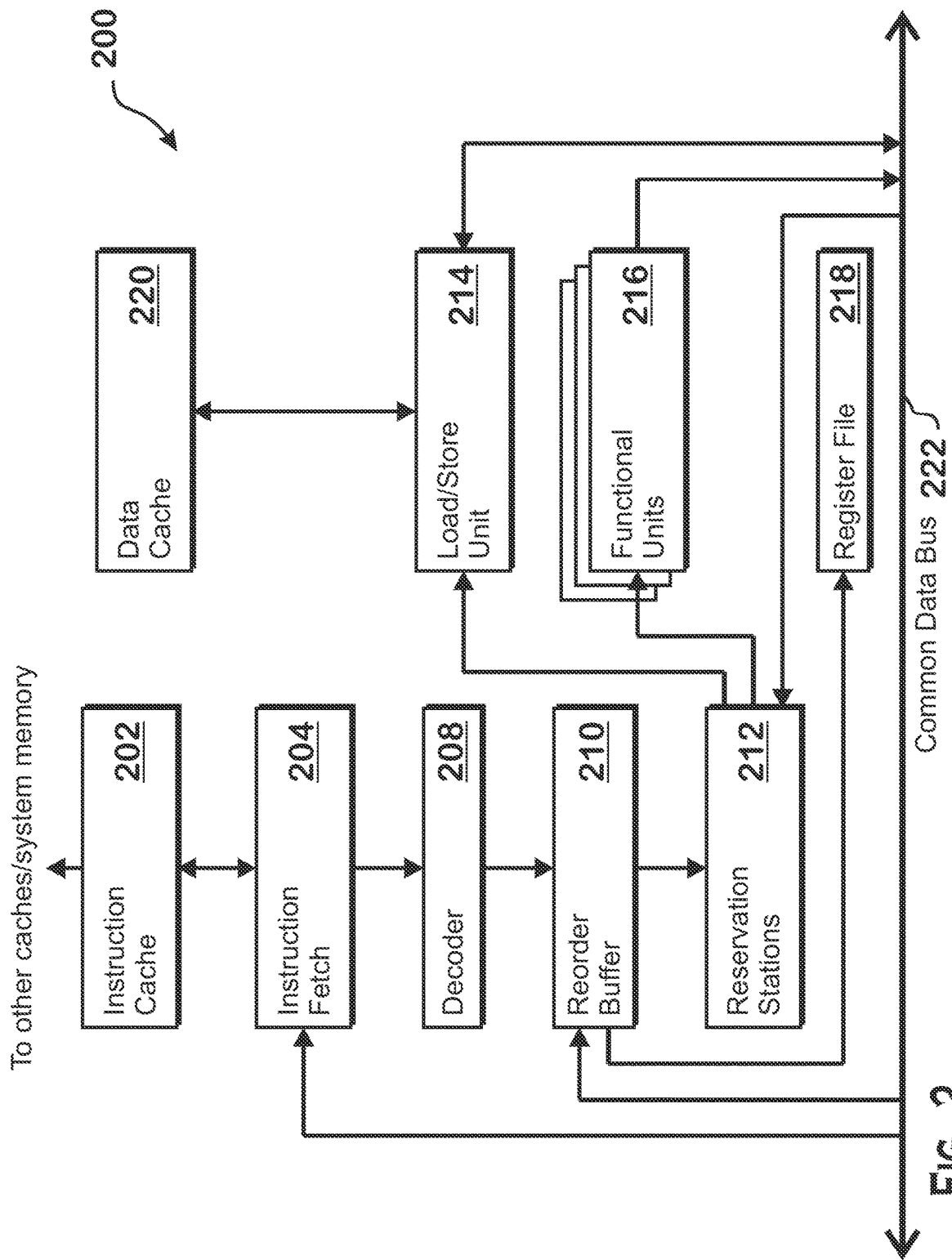
FIG. 2 is a block diagram of an instruction execution pipeline, located within the processor of FIG. 1.

FIG. 2 is a block diagram of an instruction execution pipeline 200, located within the processor 102 of FIG. 1. Although one specific configuration for an instruction execution pipeline 200 is illustrated, it should be understood that any instruction execution pipeline 200 that uses a branch target buffer to prefetch instructions into an instruction cache falls within the scope of the present disclosure. The instruction execution pipeline 200 retrieves instructions from memory and executes the instructions, outputting data to memory and modifying the state of elements associated with the instruction execution pipeline 200, such as registers within register file 218.

The instruction execution pipeline 200 includes an instruction fetch unit 204 that fetches instructions from system memory (such as memory 104) using an instruction cache 202, a decoder 208 that decodes fetched instructions, functional units 216 that perform calculations to process the instructions, a load store unit 214 that loads data from or store data to system memory via a data cache 220, and a register file 218, which includes registers that store working data for the instructions. A reorder buffer 210 tracks instructions that are currently in-flight and ensures in-order retirement of instructions despite allowing out-of-order execution while in-flight. The term "in-flight instructions" refers to instructions that have been received by the reorder buffer 210 but have not yet had results committed to the architectural state of the processor (e.g., results written to a register file, or the like). Reservation stations 212 maintain in-flight instructions and track instruction operands. When all operands are ready for execution of a particular instruction, reservation stations 212 send the instruction to a functional unit 216 or a load/store unit 214 for execution. Completed instructions are marked for retirement in the reorder buffer 210 and are retired when at the head of the reorder buffer queue 210. Retirement refers to the act of committing results of an instruction to the architectural state of the processor. For example, writing an addition result to a register, by an add instruction, writing a loaded value to a register by a load instruction, or causing instruction flow to jump to a new location, by a branch instruction, are all examples of retirement of the instruction.

Various elements of the instruction execution pipeline 200 communicate via a common data bus 222. For example, the functional units 216 and load/store unit 214 write results to the common data bus 222 which may be read by reservation stations 212 for execution of dependent instructions and by the reorder buffer 210 as the final processing result of an in-flight instruction that has finished execution. The load/store unit 214 also reads data from the common data bus 222. For example, the load/store unit 214 reads results from completed instructions from the common data bus 222 and writes the results to memory via the data cache 220 for store instructions.

Typically, the instruction fetch unit 204 fetches instructions sequentially in memory. Sequential control flow may be interrupted by branch instructions, which causes the instruction pipeline 200 to fetch instructions from a non-sequential address. Branch instructions may be conditional, causing a branch only if a particular condition is satisfied, or non-conditional, and may specify a target directly or indirectly. Direct targets are specified by constants in the instruction byte itself and indirect targets are specified by values in a register or in memory. Direct and indirect branches may be conditional or non-conditional.

As described above, the instruction fetch unit 204 fetches instructions from an instruction cache 202 for execution by the rest of the pipeline 200. In general, instruction fetch involves several phases: branch prediction, address translation, and micro-operation fetch.

Branch prediction involves predicting the control flow path through a program stored in memory. More specifically, as is generally known, a program is laid out in a certain manner in memory. Execution without control flow change involves sequentially fetching instructions and executing those instructions. Control flow instructions such as branches and jumps have the capability to alter the address from which instructions are fetched. Such instructions "jump" to a target address, either unconditionally or based on the result of a conditional evaluation. The branch predictor 302 utilizes heuristics to predict the outcomes of these branch and jump instructions, in order to predict a most likely path through the program.

In some implementations, the output of branch prediction is instruction addresses in a virtual address space. Address translation involves translating the addresses of these instructions from the virtual address space to a physical address space, so that the instructions can be loaded from memory. In general, an address translation system includes a page table walker that accepts virtual addresses, looks those virtual addresses up in a page table, and provides physical addresses in response. Caches referred to as translation lookaside buffers (TLB's) cache address translations for faster access. The TLBs are, in some implementations, arranged in a hierarchy (including, for example, level 0 (L0) TLBs, level 1 (L1) TLBs, level 2 (L2) TLBs, and so on).

Micro-operation fetch includes fetching the instructions from memory based on the physical addresses. In some implementations, this fetching occurs through a cache hierarchy. Micro-operation fetch also includes translating the fetched instructions into micro-operations via instruction-to-operation translation logic. In some implementations, instruction-to-operation translations are cached (for example, in a micro-operation cache) for quick retrieval at a subsequent time.

As described, a translation lookaside buffer fetches instruction address translations for instructions in the predicted path. Techniques are provided herein for improving the latency with which address translations are fetched.

Figure 3A:
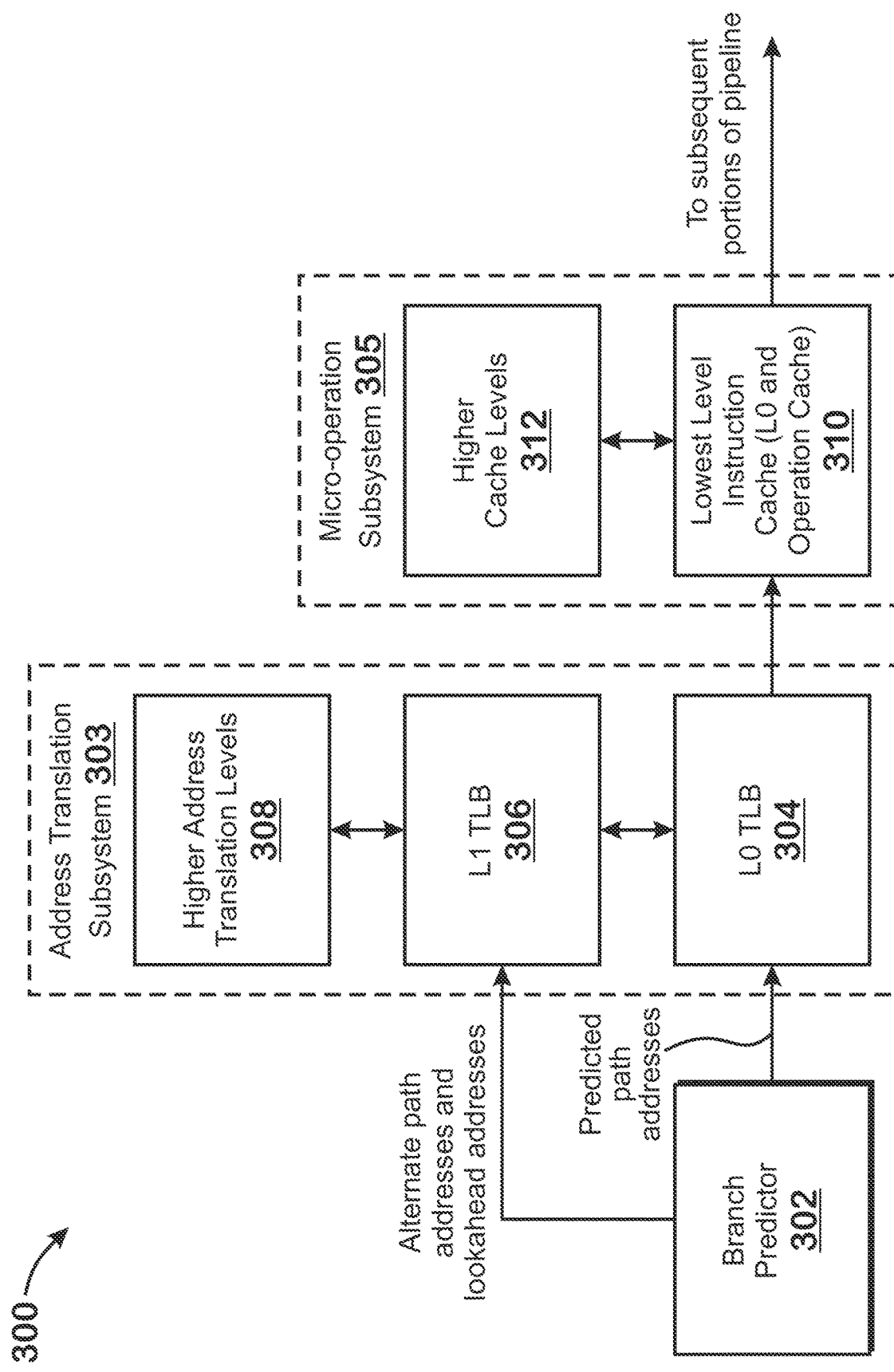
FIG. 3A illustrates an example instruction fetch subsystem.

FIG. 3A illustrates an example instruction fetch subsystem 300. The instruction fetch subsystem includes a branch predictor 302, an address translation subsystem 303, and a micro-operation subsystem 305.

The address translation subsystem 303 includes a level 0 TLB 304, a level 1 TLB 306, and higher address translation levels 308, which, in various implementations, include higher TLB levels and/or a page table walker that performs address translation based on the contents of one or more page tables.

The micro-operation subsystem 305 includes a lowest level instruction cache 310 and higher cache levels 312. In some examples, the lowest level instruction cache 310 includes a level 0 instruction cache and an operation cache 310. In some examples, the lowest level instruction cache 310 also includes an instruction-to-micro-operation decoder (not shown) that decodes instructions into micro-operations for execution by the instruction pipeline 200.

The branch predictor performs branch prediction operations, identifying predicted path addresses which are the instruction addresses from which the instruction fetch subsystem 300 is to fetch instructions. As shown, the branch predictor 302 sends these predicted addresses to the lowest level TLB 304 for address translation. The lowest level TLB 304 functions as a cache, storing a subset of all translations in the page tables for quick translation. However, it is possible for the branch predictor 302 to request a translation that is not stored in the lowest level TLB 304. In that instance, the lowest level TLB 304 requests such translation from the level 1 TLB 306. In the situation that the level 1 TLB 306 has such translation, the level 1 TLB 306 returns that translation to the lowest level TLB 304. In the instance that the level 1 TLB 306 does not have the translation, then the level 1 TLB 306 requests the translation from the higher address translation levels 308, and so on. The L0 TLB 304 provides instruction address translations to the micro-operation subsystem 305 to obtain the instructions at that address and convert those instructions into micro-operations.

In the instruction fetch subsystem 300, the branch predictor 302 requests that the level 1 TLB 306 prefetch certain address translations, in order to reduce the performance decrease associated with a miss in the level 0 TLB 304. Specifically, the branch predictor 302 prefetches one or both of address translations from alternate branch paths and address translations that are in "lookahead" branch paths, which are further advanced in program control flow than the "primary" branch path instruction addresses sent to the level 0 TLB 304. The alternate branch paths may be the code which is not the same as the predicted path. If the branch was predicted taken, then the alternate path is the not-taken path. If the branch was predicted not-taken, then the alternate path is the taken path. For indirect branches, the alternate path may be a lower confidence target of the indirect branch predictor.

In some implementations, the branch predictor 302 selects particular alternate paths for which to fetch address translations into the level 1 TLB 306. In some implementations, the branch predictor 302 maintains or calculates information indicating the confidence that any particular branch decision (for conditional branches) and/or branch target is correct. In some implementations, the alternate branch paths for which address translations are prefetched into the level 1 TLB 306 include the paths for which the confidence level is relatively low (the maintained or calculated confidence is below a threshold). In other words, the branch predictor 302 fetches translations into the level 1 TLB 306 for alternate paths past branch points where the confidence for the path that is taken at that branch point is lower than the threshold. In such instances, it is relatively likely that a branch misprediction will occur, and thus it is relatively likely that the translations in the level 1 TLB 306 will be used. In some implementations, the branch predictor 302 periodically (e.g., once every certain number of cycles) includes, in the alternate paths, not-taken paths for high-confidence branch predictions, since such high confidence branch predictions will sometimes be wrong.

In some implementations, the branch predictor 302 detects a loop execution and attempts to maintain the address translation for the loop exit target in the L1 TLB 306. Note that this loop exit may be a taken branch to another page or it may be a not-taken branch near the end of a page. In some implementations, the branch predictor 302 detects a loop execution by detecting that control flow repeatedly returns to the same code. The loop exit is the code to be executed when the loop is finished. In various implementations, the branch predictor 302 periodically requests that the L1 TLB 306 fetch and/or store the address translation for code that will be executed after the loop exit.

In some implementations, the branch predictor 302 limits the translations fetched from alternate paths based on a branch depth. The branch depth indicates the number of branches beyond a fork point which the branch predictor 302 obtains translations. In various examples, the branch depth is a tunable parameter or a fixed parameter. In various implementations, the tunable parameter is set based on a runtime heuristic or based on a parameter set by an entity such as the operating system or an application.

In some implementations, the branch predictor 302 limits the translations fetched from alternate paths based on an alternate path translations number limit. The alternate path translation number limit indicates the limit for total number of translations in all alternate paths that can be prefetched into the L1 TLB 306 in a given sliding time window.

As described above, the branch predictor 302 alternatively or additionally prefetches address translations from the "primary" (taken) path that are further in program order than the predicted path addresses requested to be stored into the level 0 TLB 304. These are sometimes referred to herein as "lookahead" address translations or the lookahead path.

By fetching, into the level 1 TLB 306, addresses that are further in time and/or that are in alternate paths than those fetched into the level 0 TLB 304, the penalty of branch mispredictions, or the overall latency of a miss in the level 0 TLB 304, is reduced, since resulting misses in the level 0 TLB 304 would be able to fetch data from the level 1 TLB 306, rather than from higher levels of the address translation subsystem 303.

The micro-operation subsystem 305 fetches micro-operations for execution by the instruction pipeline 200. The micro-operation subsystem 305 includes a lowest level instruction cache 310. In some implementations, the lowest level instruction cache 305 includes a lowest level instruction cache memory that caches instructions for decoding and an operation cache that caches previously decoded instructions. In the situation that the lowest level instruction cache 310 receives an instruction for which decoded micro-operations already exist in the operation cache, the lowest level instruction cache 310 transmits those instructions to the rest of the instruction pipeline 200 for execution. In the situation that the lowest level instruction cache 310 receives an instruction for which decoded micro-operations do not already exist in the operation cache, the lowest level instruction cache 310 fetches the instructions from the cache hierarchy, starting with the lowest level instruction cache memory of the lowest level instruction cache 310 and proceeding up the hierarchy to the higher cache levels 312, and, once received, decodes those instructions into micro-operations for transmission to the instruction pipeline 200 for execution.

Figure 3B:
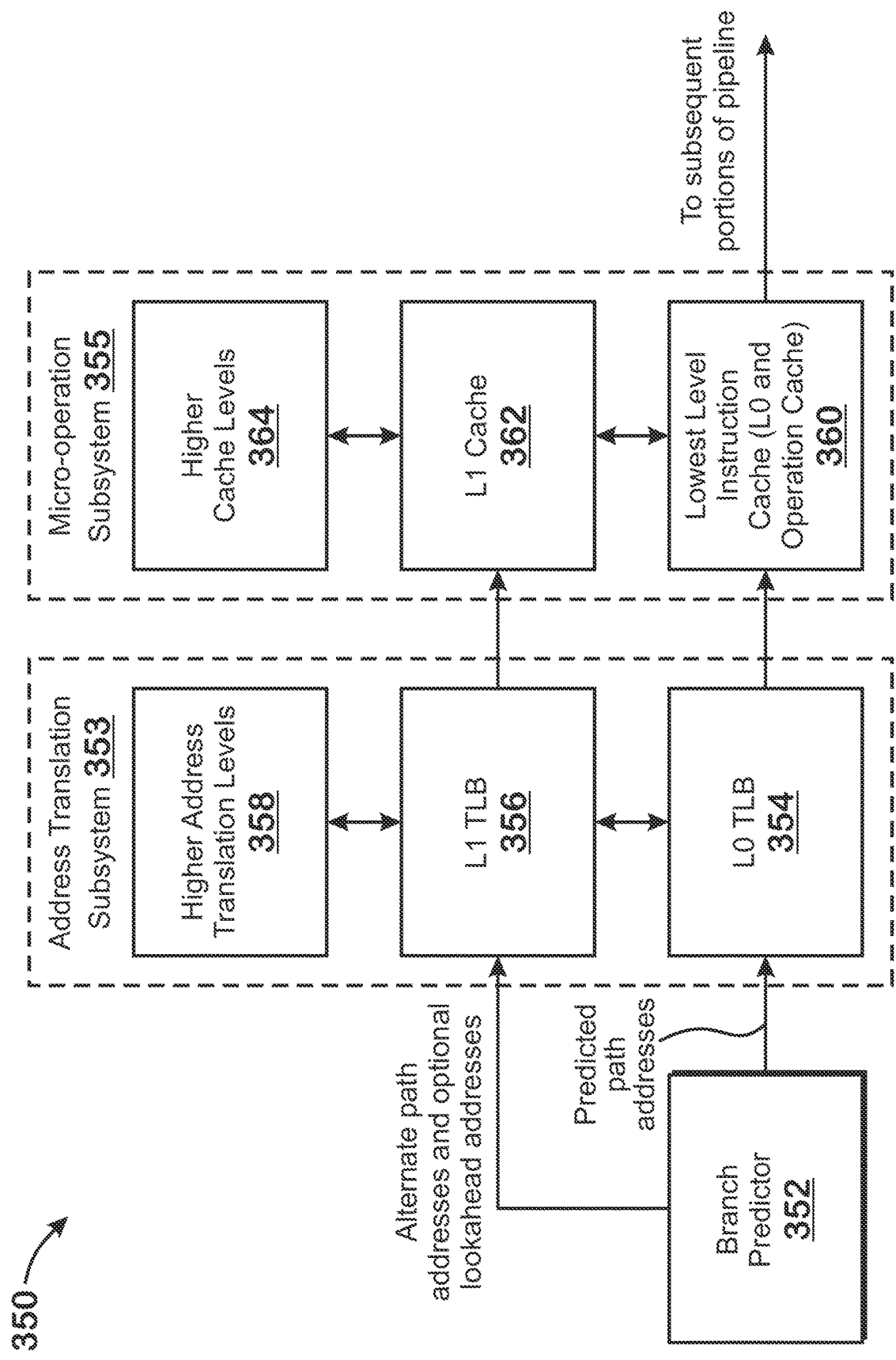
FIG. 3B illustrates another example instruction fetch system.

FIG. 3B illustrates another example instruction fetch system 350. The instruction fetch system 350 includes a branch predictor 352, an address translation subsystem 353, and a micro-operation subsystem 355. The address translation subsystem 353 includes a level 0 TLB 354, a level 1 TLB 356, and higher address translation levels 358. The micro-operation subsystem 355 includes a lowest level instruction cache 360, a level 1 cache 362, and higher cache levels 364.

The branch predictor 352 performs similar operations as with the branch predictor 302 of FIG. 3A, with regards to the address translation subsystem 353. Specifically, the branch predictor 352 generates addresses for a "primary" path, sending those addresses to the level 0 TLB 354 for address translation. The branch predictor 352 also generates addresses for alternate paths and/or lookahead paths for transmission to the level 1 TLB 356. The level 0 TLB 354 and level 1 TLB 356, as well as the higher address translation levels 358 function in a similar manner s with the level 0 TLB 304, level 1 TLB 306, and higher address translation levels 308 of FIG. 3A.

In addition to providing the address translation subsystem 353 with indications of the instruction of the alternate path addresses and optional lookahead addresses, the branch predictor 352 also provides data indicating these instructions to the level 1 cache 362 for pre-fetching. Thus, in addition to prefetching certain address translations into the level 1 TLB 356, in the instruction fetch system 350, the level 1 cache 362 pre-fetches the instructions of the alternate path and/or lookahead path.

The instruction fetch system 350 is similar to the instruction fetch system 300 of FIG. 3A, except that the branch predictor provides information to the micro-operation subsystem 305 for fetching instructions from the alternate paths and/or the lookahead paths. Thus in the system 350 of FIG. 3B, the micro-operation subsystem 305 fetches instructions from the alternate paths and/or lookahead paths in any of the instances that the address translation subsystem 353 prefetches corresponding address translations (where "corresponding address translations" to instructions are address translations for the addresses at which the instructions are found). Put differently, the present disclosure contemplates implementations of an instruction fetch system 350 that prefetches instructions according to any combination of situations in which the address translation subsystem 35 prefetches corresponding address translations discussed herein.

Figure 4:
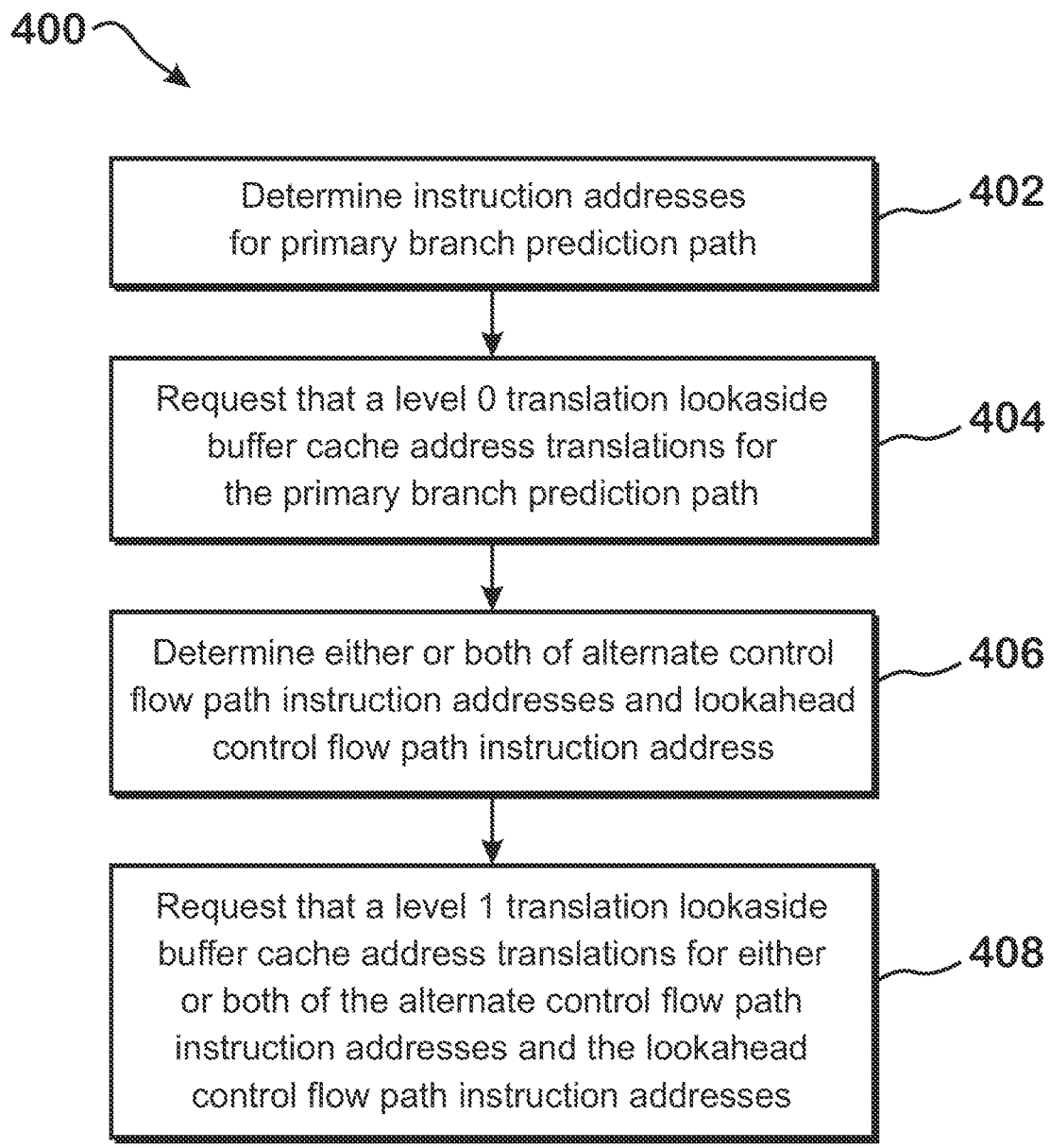
FIG. 4 is a flow diagram of a method for performing instruction fetch operations, according to an example.

FIG. 4 is a flow diagram of a method 400 for performing instruction fetch operations, according to an example. Although the method 400 is described with respect to the system of FIGS. 1-3B, those of skill in the art will recognize that any system, configured to perform the steps of the method 400 in any technically feasible order, falls within the scope of the present disclosure.

The method 400 begins at step 402, where a branch predictor 302 determines instruction addresses for a primary branch prediction path. As stated elsewhere herein, branch prediction is a known technique whereby a branch predictor uses branch prediction data such as which instruction addresses are known or predicted to be branch instructions, information derived from at least portions of branch addresses, targets (instruction addresses jumped to) branch instructions previously branched to, whether conditional branches were previously taken or not taken, as well as previously-seen control flow patterns, to make a prediction as to the destination of a particular branch. In some implementations, the branch predictor 302 stores branch prediction data on a cache line basis, where the data includes information indicating the number of branches in that cache line and information allowing the branch predictor 302 to determine predicted targets for those branches.

The branch predictor 302 determines a primary control flow path, which includes instruction addresses for the control flow path that the branch predictor 302 predicts the instruction execution pipeline 200 will actually follow. This primary control flow path is distinguished from one or more alternate paths, which include at least a portion of instructions that the branch predictor 302 predicts the instruction execution pipeline 200 will not follow. The primary control flow path is distinguished from the lookahead control flow path in that the lookahead control flow path includes instructions further ahead in time in the predicted control flow path than the primary control flow path.

At step 404, the branch predictor 302 requests that a level 0 translation lookaside buffer caches the address translations for the primary branch prediction path. In some implementations, the level 0 translation lookaside buffer is the lowest level TLB available for use by the branch predictor 302.

At step 406, the branch predictor 302 determines either or both of alternate control flow path instruction addresses and lookahead control flow path instruction addresses. For lookahead control flow path instruction addresses, in some implementations, the branch predictor 302 performs the same operations for determining the instruction addresses of the primary branch prediction path, but obtains instructions that are further in the program control flow than the primary branch prediction path (also referred to as "further in time" in this document). For alternate control flow path instructions, the branch predictor 302 identifies control flow for conditional branch decisions other than the ones that are predicted (e.g., identifies a control flow path past a branch for the "not-taken" direction if the branch is predicted to be taken) and/or identifies branch targets for indirect branches that are not predicted to be taken. An indirect branch specifies a branch target based on a variable, not on a constant, and therefore the branch predictor 302 sometimes stores multiple candidate targets for an indirect branch. In some instances, the branch predictor predicts a certain target is the taken target for an indirect branch and, for the alternate control flow paths, selects one or more not-taken targets for such branches as indicating the control flow paths for which to obtain instruction addresses.

At step 408, the branch predictor 302 requests that a level 1 TLB 306 cache the translations for the instruction addresses determined at step 406. With these addresses cached, the latency from the level 1 TLB 306 to higher portions of the address translation subsystem 303 is hidden.

In some implementations, the granularity for which the branch predictor 302 requests new address translations is at the memory page level and not the individual instruction level, since typically, a virtual address and physical address share the same in-page offset but differ by page number. Thus, in some implementations, the branch predictor 302 sends, to the address translation subsystem 303, new page addresses for translation, and does not send the same page address for translation for multiple instructions encountered in a given time period (for example, a given cycle).

In the implementation of FIG. 3B, the L1 TLB 356 (for example, at the direction of the branch predictor 302 or other logic) requests that the L1 cache 362 fetch instructions at the addresses corresponding to the alternate path and/or lookahead path. This occurs in addition to the action of requesting the L1 TLB 356 cache address translations for the alternate path and/or lookahead path.

Regarding the flow diagram 400, it should be understood that actions described as being performed by the branch predictor 302, L0 TL 304, L1 TLB 306, and higher address translation levels 308, are performed by the branch predictor 352, L0 TLB 354, L1 TLB 356, and higher address translation levels 358 in the implementation of FIG. 3B.

In some examples, the steps of FIG. 4 are performed in a single clock cycle or in certain period of time, and repeated every cycle or every certain period of time.

It should be understood that many variations are possible based on the disclosure herein. Although features and elements are described above in particular combinations, each feature or element may be used alone without the other features and elements or in various combinations with or without other features and elements. In some examples, although alternate-path or fetch-ahead address translations or instructions are described as being placed into a level 1 TLB or level 1 instruction cache, it should be understood that these items could be placed into either or both of a different TLB level (e.g., level 0 TLB or level 2 TLB, or level 0 instruction cache or level 2 instruction cache) or a different instruction cache level.

The various functional units illustrated in the figures and/or described herein (including, where appropriate, the processor 102, the input driver 112, the input devices 108, the output driver 114, the output devices 110, the instruction cache 202, the instruction fetch unit 204, the decoder 208, the reorder buffer 210, the reservation stations 212, the data cache 220, the load/store unit 214, the functional units 216, the register file 218, the common data bus 222, the branch predictors, and the caches) are implemented as hardware circuitry, or, where appropriate, as software executing on a processor or a combination of software executing on a processor and hardware. The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for performing instruction fetch operations, the method comprising:
   determining instruction addresses for a primary branch prediction path, wherein the primary branch prediction path comprises a control flow path to which execution is predicted to flow;
   requesting that a level 0 translation lookaside buffer ("TLB") caches address translations for the primary branch prediction path instruction addresses;
   determining alternate control flow path instruction addresses for an alternate control flow path, wherein the alternate control flow path comprises a control flow path to which execution is not predicted to flow; and
   requesting that a level 1 TLB and not the level 0 TLB caches address translations for the alternate control flow path instruction addresses.

2. The method of claim 1, wherein the primary branch prediction path includes control flow paths past branch targets predicted as being taken and not past branch targets predicted as being not-taken.

3. The method of claim 1, wherein the alternate control flow path instruction addresses comprise instruction addresses for one or more alternate control flow paths defined by control flow past one or more branch targets predicted as not-taken.

4. The method of claim 1, further comprising:
   requesting an instruction cache store instructions corresponding to the alternate control flow path instruction addresses.

5. The method of claim 1, wherein the alternate control flow path instruction addresses include one or more of a loop exit, and a not-taken branch target for a branch whose taken-target has a low confidence metric.

6. The method of claim 1, further comprising:
   periodically including, in the alternate control flow path instruction addresses, a not-taken branch target for a branch whose taken-target has a high confidence metric.

7. The method of claim 1, wherein the instruction addresses for the primary path and the alternate control flow path instruction addresses comprise page addresses.

8. The method of claim 1, wherein the alternate control flow path instruction addresses include not-taken addresses for indirect branches.

9. An instruction fetch system for performing instruction fetch operations, the instruction fetch system comprising:
   a level 0 translation lookaside buffer ("TLB");
   a level 1 TLB; and
   a branch predictor configured to:
      determine instruction addresses for a primary branch prediction path, wherein the primary branch prediction path comprises a control flow path to which execution is predicted to flow;
      request that the level 0 translation lookaside buffer ("TLB") caches address translations for the primary branch prediction path instruction addresses;
      determine alternate control flow path instruction addresses for an alternate control flow path, wherein the alternate control flow path comprises a control flow path to which execution is not predicted to flow; and
      request that the level 1 TLB and not the level 0 TLB caches address translations for the alternate control flow path instruction addresses.

10. The instruction fetch system of claim 9, wherein the primary branch prediction path includes control flow paths past branch targets predicted as being taken and not past branch targets predicted as being not-taken.

11. The instruction fetch system of claim 9, wherein the alternate control flow path instruction addresses comprise instruction addresses for one or more alternate control flow paths defined by control flow past one or more branch targets predicted as not-taken.

12. The instruction fetch system of claim 9, wherein the branch predictor is further configured to:
    request an instruction cache store instructions corresponding to the alternate control flow path instruction addresses.

13. The instruction fetch system of claim 9, wherein the alternate control flow path instruction addresses include one or more of a loop exit, and a not-taken branch target for a branch whose taken-target has a low confidence metric.

14. The instruction fetch system of claim 9, wherein the branch predictor is further configured to:
    periodically include, in the alternate control flow path instruction addresses, a not-taken branch target for a branch whose taken-target has a high confidence metric.

15. The instruction fetch system of claim 9, wherein the instruction addresses for the primary path and the alternate control flow path instruction addresses comprise page addresses.

16. The instruction fetch system of claim 9, wherein the alternate control flow path instruction addresses include not-taken addresses for indirect branches.

17. A system for performing instruction fetch operations, the system comprising:
    an instruction execution pipeline; and
    a memory storing instructions for execution by the instruction execution pipeline,
    wherein the instruction execution pipeline is configured to:
       determine instruction addresses for a primary branch prediction path, wherein the primary branch prediction path comprises a control flow path to which execution is predicted to flow;
       request that a level 0 translation lookaside buffer ("TLB") caches address translations for the primary branch prediction path instruction addresses;
       determine alternate control flow path instruction addresses for an alternate control flow path, wherein the alternate control flow path comprises a control flow path to which execution is not predicted to flow; and
       request that a level 1 TLB and not the level 0 TLB caches address translations for the alternate control flow path instruction addresses.

18. The system of claim 17, wherein the primary branch prediction path includes control flow paths past branch targets predicted as being taken and not past branch targets predicted as being not-taken.

19. The system of claim 17, wherein the alternate control flow path instruction addresses comprise instruction addresses for one or more alternate control flow paths defined by control flow past one or more branch targets predicted as not-taken.

20. The system of claim 17, wherein the instruction execution pipeline is further configured to:

request an instruction cache store instructions corresponding to the alternate control flow path instruction addresses.

\* \* \* \* \*